US005146182A

United States Patent [19]
Shiga

[11] Patent Number: 5,146,182
[45] Date of Patent: Sep. 8, 1992

[54] MICROWAVE DEVICE

[75] Inventor: Nobuo Shiga, Yokohama, Japan

[73] Assignee: Sumitomo Electric Industries, Ltd., Japan

[21] Appl. No.: 704,090

[22] Filed: May 22, 1991

[30] Foreign Application Priority Data

May 25, 1990 [JP] Japan .................................. 2-136837

[51] Int. Cl.[5] .............................................. H04B 1/26

[52] U.S. Cl. .................................... 330/307; 455/325; 455/327

[58] Field of Search ................. 307/424; 330/4.9, 277, 330/286, 307, 310; 333/247; 455/323, 325, 327, 333

[56] References Cited

U.S. PATENT DOCUMENTS

| | | | |
|---|---|---|---|
| 3,679,985 | 7/1972 | Fang et al. | 330/4.9 X |
| 4,233,530 | 11/1980 | Mikoshiba et al. | 307/424 |
| 4,691,376 | 9/1987 | Watanabe et al. | 455/327 X |
| 4,996,718 | 2/1991 | Shiomi | 455/323 |
| 5,028,879 | 7/1991 | Kim | 330/286 X |

FOREIGN PATENT DOCUMENTS

| | | | |
|---|---|---|---|
| 0005709 | 1/1987 | Japan | 455/325 |
| 0079516 | 3/1990 | Japan | 455/323 |

*Primary Examiner*—Steven Mottola
*Attorney, Agent, or Firm*—Beveridge, DeGrandi & Weilacher

[57] ABSTRACT

There is disclosed a microwave device having a substrate made of a dielectric material and a frequency conversion circuit formed on a front surface of the substrate and including a microstrip line for input and output and a radio frequency amplifier. The substrate is partially thinned in a portion of a rear surface thereof which faces the radio frequency amplifier. The microstrip line width is a change in the characteristic impedance of microstrip lines which cross the front surface of the substrate where its thickness changes due to the partially thinned portion, is smaller than 10%.

8 Claims, 5 Drawing Sheets

Fig. 3
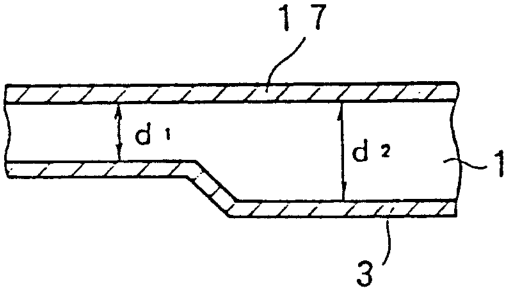
Fig. 4(a)
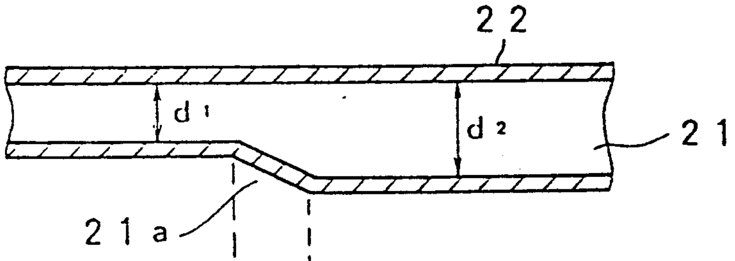
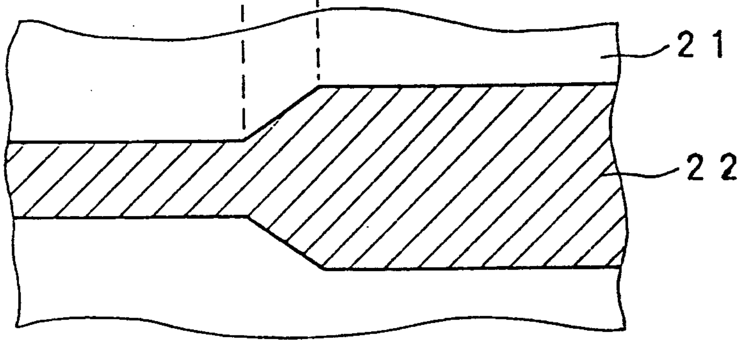
Fig. 4 (b)

MICROWAVE DEVICE

BACKGROUND OF THE INVENTION

1. Field of the Invention

The present invention relates to a microwave device for amplifying low noise, which is used in a receiver for, e.g., a direct broadcast satellite (DBS) system.

2. Related Background Art

Conventionally, a microwave device of this type often employs a microstrip line prepared by forming a metal thin film on a dielectric member. FIG. 1 shows a general structure of the microstrip line. As shown in FIG. 1, a conductive layer 31 is formed on a rear surface of a dielectric member 32 having a thickness 41, and a strip conductor 33 having a width 42 is formed on the front surface of the dielectric member 32, thus constituting a microstrip line.

In the microwave device, a demand has arisen for decreasing the thickness of the dielectric member 32. When the thickness of the dielectric member 32 is decreased, the following advantages are obtained.

First, since the width 42 of the strip conductor 33 can be decreased, chip size can be reduced. Since the characteristic impedance of the microstrip line is expressed by a ratio of the width 42 of the strip conductor 33 to the thickness 41 of the dielectric member 32, if the thickness of the dielectric member 32 is decreased, the width of the strip conductor 33 can also be decreased within a range wherein the ratio is left unchanged.

Second, when the thickness of the dielectric member 32 is decreased, a through hole or "via-hole" connecting the conductive layer 31 and the strip conductor 33 can be rendered shallow, and a transmission loss between the layer 31 and the conductor 33 can be reduced. Thus, low-noise characteristics can be improved.

Third, variations in shape and dimensions of the via-hole can be reduced, and variations in performance of the microwave device can be eliminated.

In this manner, it is important to decrease the thickness of the dielectric member 32 in view of an improvement of the perforance of the microwave device. In particular, since a RF amplifier of a down converter is required to have good low-noise characteristics, if the thickness of the dielectric member can be decreased, a remarkable improvement of the performance can be expected.

However, when the thickness is decreased, the following new problems are posed.

First, if the thickness is excessively decreased in a process of decreasing the thickness of the dielectric member 32, the yield is decreased.

Second, since it is difficult to handle a semiconductor having a decreased thickness, the yield in the process after the decrease in thickness is decreased.

Third, a transmission loss is increased.

As described above, when the thickness of the dielectric member 32 can be decreased, the performance can be improved. However, the thickness of the dielectric member 32 cannot be decreased drastically due to the above-mentioned problems.

SUMMARY OF THE INVENTION

It is an object of the present invention to eliminate the above-mentioned problems, and to improve the perforance of a microwave device by decreasing the thickness of the dielectric member 32.

In the present invention, since the thickness of the dielectric substrate is partially decreased, low-noise characteristics of a frequency conversion circuit formed on the microwave device can be improved without decreasing the mechanical strength of the microwave device. In addition, since the microstrip line which crosses the upper surface of the dielectric substrate whose thickness is changed has a high characteristic impedance, the characteristic impedance of the microstrip line, which crosses portions of the substrate having different thicknesses is not considerably changed.

Further according to the present invention, a dielectric substrate of a circuit portion of a RF low-noise amplifier is locally removed from a lower surface thereof to have a small thickness, and a microstrip line which crosses the upper surface of the dielectric substrate, a thickness of which is changed, is formed to have a high characteristic impedance.

Concretely, one object of the present invention is to provide a microwave device comprising a substrate made of a dielectric material and a frequency conversion circuit formed on a front surface of said substrate and having a microstrip line for input and output thereof and a radio frequency amplifier, said substrate being partially thinned in a portion of a rear surface thereof which faces said radio frequency amplifier, the width of said microstrip lines being selected so that the change in the characteristic impedance of the microstrip lines which cross the front surface of the substrate, a thickness of which is changed, is smaller than 10%.

A further object of the present invention is to provide a microwave device comprising a substrate made of a dielectric material and having a conductive layer for a microstrip line on a rear surface thereof and a frequency conversion circuit formed on a front surface of said substrate and having a microstrip line for an input and output and a radio frequency amplifier a portion of said radio frequency amplifier being electrically connected to said conductive layer through a through hole formed in said substrate, said substrate being partially thinned in a portion of said back surface thereof corresponding to said through hole, and the width of said microstrip lines being selected so that the change in the characteristic impedance of the microstrip line, which crosses the front surface of the substrate, a thickness of which is changed, is smaller than 10%.

The present invention will become more fully understood from the detailed description given hereinbelow and the accompanying drawings which are given by way of illustration only, and thus are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

FIG. 3 is a partially enlarged sectional view in a direction perpendicular to the line B—B of the down converter shown in FIG. 2A;

FIG. 4A is a partially enlarged sectional view of a down converter which is not effective to prevent mismatching in a line portion;

FIG. 4B is a plan view of the down converter shown in FIG. 4A;

DESCRIPTION OF THE PREFERRED EMBODIMENT

An embodiment of the present invention will be described below with reference to FIGS. 2A and 2B of the accompanying drawings.

Figure 1:
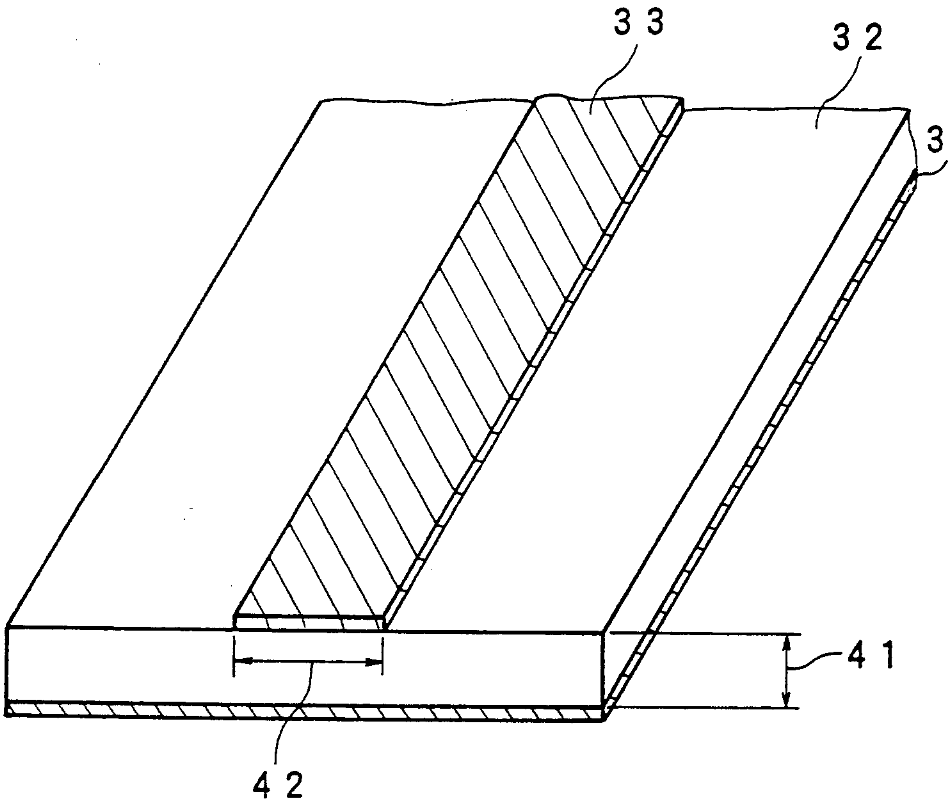
FIG. 1 is a perspective view showing a conventional microstrip line.
Figure 2A:
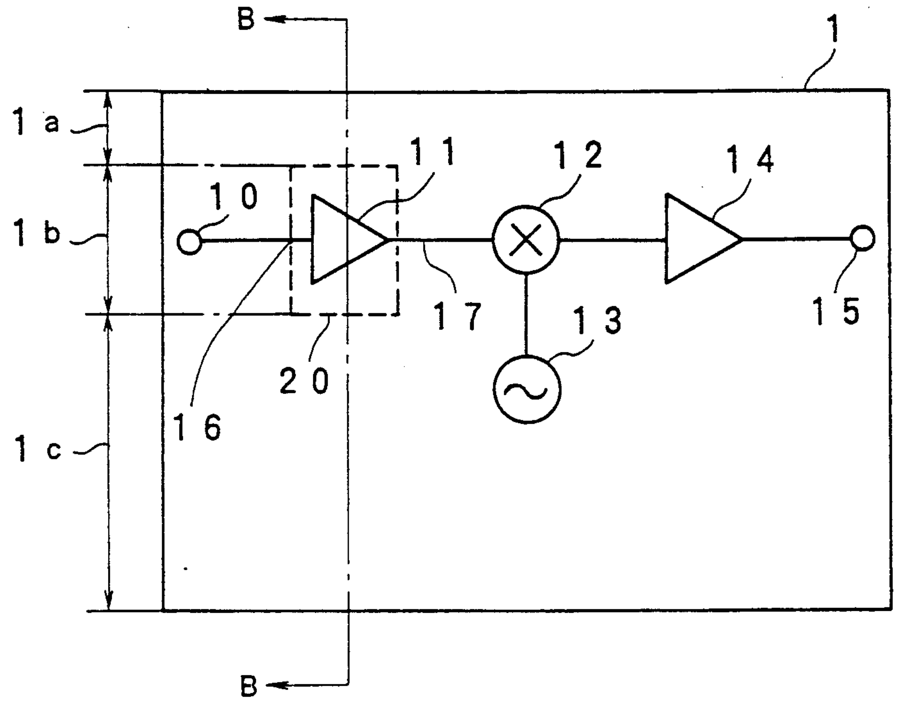
FIG. 2A is a plan view showing a down converter according to an embodiment of the present invention.
Figure 2B:
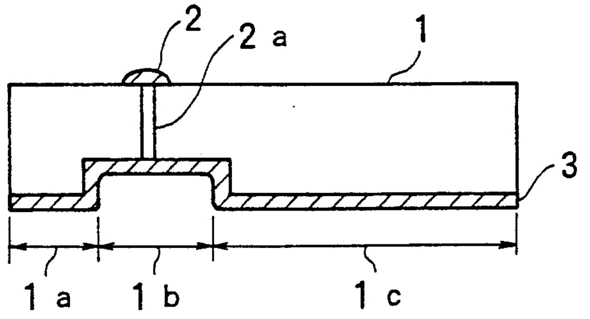
FIG. 2B is a sectional view taken along a line B—B in FIG. 2A.

FIG. 2A is a plan view showing a circuit of a down converter according to the embodiment of the present invention, and FIG. 2B is a sectional view taken along a line B—B in FIG. 2A. In FIGS. 2A and 2B, a RF amplifier 11, a reception mixer 12, an oscillation circuit 13, and an IF amplifier 14 are respectively formed on a GaAs substrate 1.

The operation of the down converter is as follows. A microwave having a frequency of about 10 to 18 GHz in a radio frequency band is applied from an input terminal 10, and a signal amplified by the RF (radio frequency) amplifier 11 is mixed with a local oscillator output from the oscillation circuit 13 by the reception mixer 12. After the input signal is converted to an intermediate frequency signal of 1 to 2 GHz, the converted signal is amplified by the IF (intermediate frequency) amplifier 14, and the amplified signal is output from an output terminal 15.

Figure 5A:
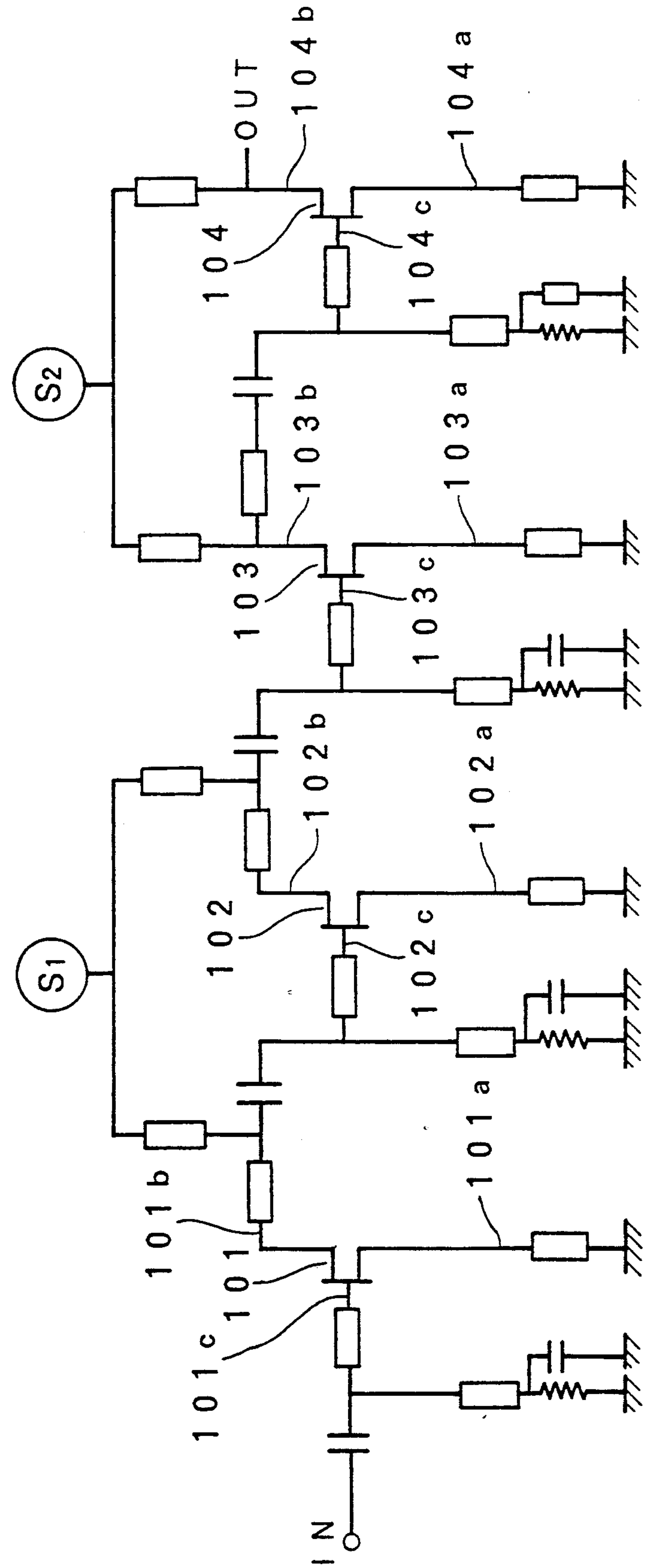
FIG. 5A shows a circuit diagram of a RF amplifier shown in FIG. 2A.

As shown in FIG. 5A, the RF amplifier 11 of the down-converter comprises four stages of FETs (Field Effect Transistor) 101, 102, 103 and 104, and source terminals 101*a*, 102*a*, 103*a* and 104*a* of the FETs 101, 102, 103 and 104, which are coresponding to a pattern 2 (FIG. 2B), respectively, are grounded through a conductive pattern 3 (FIG. 2B) formed on the rear surface of the GaAs substrate 1. The source terminals 101*a*, 102*a*, 103*a* and 104*a* are electrically connected to the conductive pattern 3 (FIG. 2B) through "via-holes" or through holes (FIG. 2B) formed in the GaAs substrate 1.

Figure 5B:
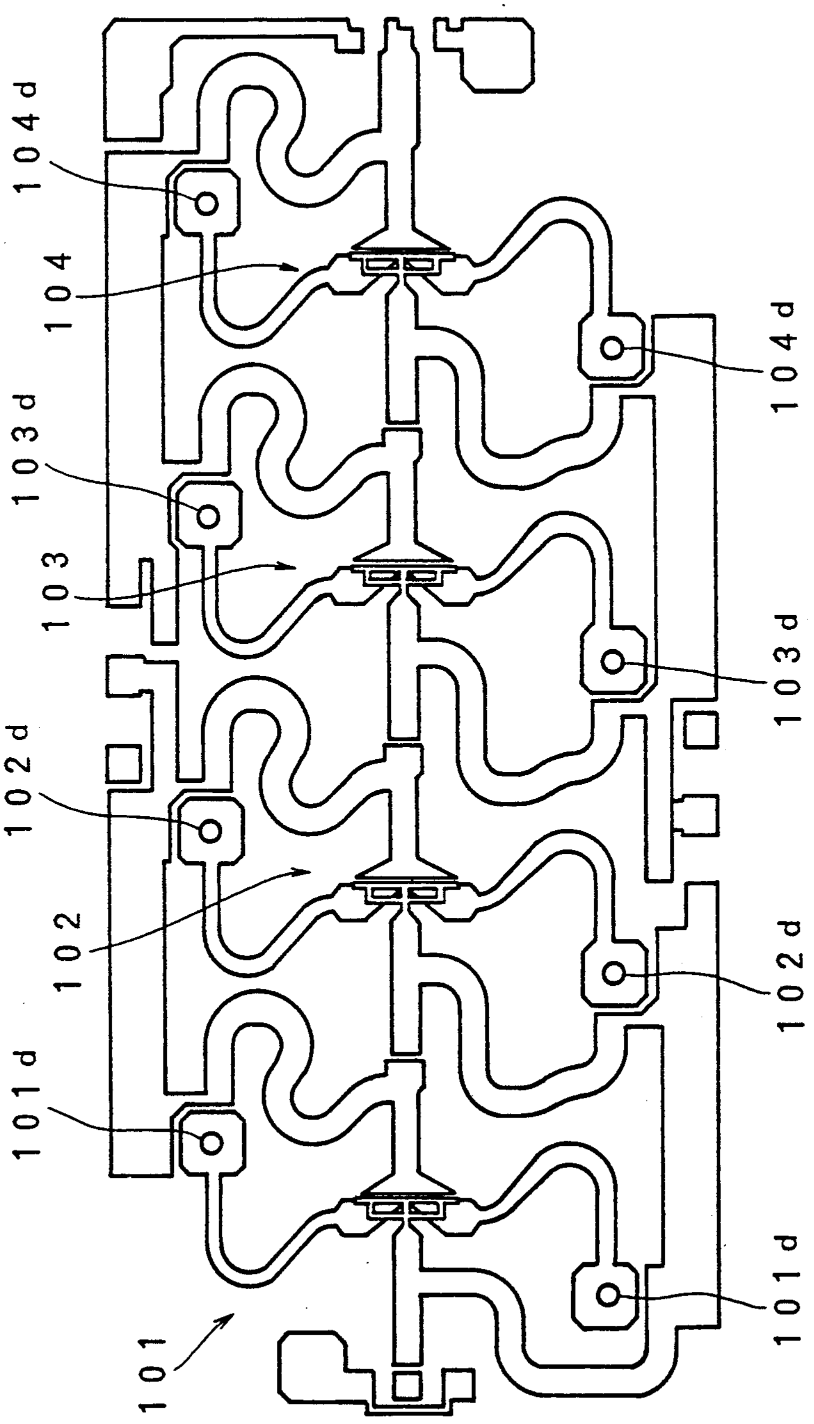
FIG. 5B shows a general view of a circuit pattern of a RF amplifier on a chip.

Further, drain terminals 101*b*, 102*b* of the FETs 101 and 102 are connected to each other and to a power supply S1. Drain terminals 103*b* and 104*b* of the FETs 103 and 104 are connected to each other and to the power supply S2. The drain terminals 101*b*, 102*b*, 103*b* and 104*d* are also respectively connected to gate terminals 101*c*, 102*c*, 103*c* and 104*c* of the next stage FET through capacitors. Gate terminals of the transistors 101, 102, 103 and 104 are grounded through load elements, such as resistances. A top view of a circuit pattern of the RF amplifier 11 formed on the micro-wave device chip is shown in FIG. 5B. As shown therein, the source terminals are connected to the conductive pattern 3 (FIG. 2B) formed on the rear surface of the GaAs substrate 1 through the via-holes 101*d*, 102*d*, 103*d* and 104*d* (FIG. 5B).

In this embodiment, the GaAs substrate 1 is used as a dielectric member.

As described above, the thickness of the GaAs substrate 1 is preferably decreased as much as possible to improve performance, for example, to minimize chip size, and to improve low-noise characteristics.

However, in manufacturing processes such as etching, electrode metal deposition, and the like, a thickness of a minimum of 400 μm is required since the mechanical strength must be high enough to withstand working processes. In this embodiment, manufacturing processes are performed using a substrate having a thickness of 400 μm, and in the final manufacturing process, the substrate is ground to have a thickness of about 150 μm. The reason why the substrate is not ground below a thickness of 150 μm is as follows. If the substrate is ground below a thickness of 150 μm, the yield of the thin film formation process itself is decreased, and the yield in, e.g., an assembling process after the thin film formation process is also decreased. In the grinding process, a method of polishing the substrate using a grinding wheel of diamond particles, and finally finishing the surface to be flat by wet etching is employed. In the wet etching, a solution having a ratio of, e.g., $H_2SO_4:H_2O_2:H_2O=1:1:10$ is used.

Since the RF amplifier 11 is required especially to have good low-noise characteristics, the thickness is preferably decreased to about 100 μm to improve the performance. As described above, since the loss of the via-hole is decreased, and variations in shape and dimensions of the via-hole can be decreased, variations in performance of ICs can be minimized.

For this reason, a portion of the GaAs substrate 1 having a thickness of 150 μm is removed to have a thickness of about 100 μm by selective wet etching using a mask. More specifically, a portion corresponding to a region including the RF amplifier 11 is removed over a length 1*b*. Finally, a conductive layer 3 is formed on the rear surface of the GaAs substrate 1.

Transmission lines 16 and 17 for respectively connecting between the input terminal 10 and the RF amplifier 11, and between the RF amplifier 11 and the reception mixer 12 are formed to have a width smaller than 10 μm, preferably, 5 μm. For example, the section of the substrate along the transmission line 17, i.e., a partial enlarged view of the substrate section in a direction perpendicular to line B—B in FIG. 2A is shown in FIG. 3. The transmission line 17 is formed to cross the front surface of the GaAs substrate 1, where the thickness of the substrate is changed from $d_1=100$ μm to $d_2=150$ μm, and the characteristic impedance of the line is higher than a characteristic impedance of 50Ω of another transmission line since the line width is smaller than 10 μm, preferably 5 μm.

Table 1 below summarizes a characteristic impedance Za on a substrate portion having a thickness of 100 μm, a characteristic impedance Zb on a substrate portion having a thickness of 150 μm, and a changing rate a between these impedances Za and Zb, when the line width of the transmission line 17 on the GaAs substrate 1 is changed.

TABLE 1

| Width [μm] | Za [Ω] | Zb [Ω] | α [%] |
|---|---|---|---|
| 5 | 102 | 111 | 8.8 |
| 10 | 90 | 99 | 10 |
| 20 | 76 | 85 | 12 |
| 40 | 62 | 71 | 15 |
| 70 | 50 | 59 | 18 |
| 100 | 43 | 51 | 19 |

TABLE 1-continued

| Width [μm] | Za [Ω] | Zb [Ω] | α [%] |
|---|---|---|---|
| 150 | 34 | 43 | 26 |

Table 1 above reveals that, for example, when the transmission line has a width of 10 μm, the characteristic impedance Za of the line portion on the substrate having a thickness of 100 μm is 90Ω the characteristic impedance Zb of the line portion on the substrate having a thickness of 150 μm is 99Ω, and the changing rate a of the characteristic impedances when the thickness of the substrate is changed from 100 μm to 150 μm is 10%. As can be understood from Table 1 above, when the line width is 10 μm, the characteristic impedance is changed by only 10%, and the influence caused by crossing portions of the substrate having different thicknesses is small.

Further, when the transmission line has a width of 5 μm, the characteristic impedance Za of the line portion on the substrate having a thickness of 100 μm is 90Ω, the characteristic impedance Zb of the line portion on the substrate having a thickness of 150 μm is 111Ω, and the change of the characteristic impedances when the thickness of the substrate is changed from 100 μm to 150 μm is 8.8%. As can be understood from Table 1 above, when the line width is 5 μm, the characteristic impedance is changed by only 8.8% which is smaller that of the line width 10 μm, and the influence caused by crossing portions of the substrate having different thickness is smaller than that of the line width, 10 μm.

In this manner, when the transmission line 17 is formed to have a line width smaller than 10 μm, even when the transmission line 17 crosses substrate portions of the GaAs substrate 1 where the thickness is changed, its characteristic impedance is not considerably changed, and no mismatching occurs. The same applies to the transmission line 16 like in the transmission line 17, and no mismatching occurs due to a change in thickness of the substrate.

In contrast to this, in a conventional microwave device, respective circuit blocks are designated to have an input/output impedance of 50Ω and are connected via transmission lines each having a characteristic impedance of 50Ω. For this reason, when the transmission line crosses a substrate portion where the thickness is changed, the characteristic impedance is largely changed, thus causing mismatching. According to the present invention, the conventional drawback can be eliminated, and no mismatching occurs.

In addition to a means for increasing a characteristic impedance by decreasing the line width of the transmission line like in this embodiment, the following means may be proposed. However, this means is not effective.

More specifically, this means is as shown in FIGS. 4A and 4B. In this means, the line width of a transmission line 22 on a substrate 21 whose thickness is changed is increased in correspondence with a change in thickness of the substrate. FIG. 4A is a sectional view of the substrate along the transmission line, and FIG. 4B is a plan view of the substrate. With this means, when etching for decreasing the thickness of a lower surface portion corresponding to an RF amplifier is performed in the manufacture of a microwave device, perfect alignment with a pattern of the upper surface must be achieved. For this reason, this causes difficulty in the manufacturing technique, and is not practical. Furthermore, in FIGS. 4A and 4B, a stepped portion 21*a* of the lower surface is illustrated as a forward mesa pattern. However, in a direction perpendicular to the sectional direction, the stepped portion has a reverse mesa pattern, and the means shown in FIGS. 4A and 4B cannot be used.

However, when the above-mentioned structure according to this embodiment is employed, high-precision alignment is not required in lower surface etching in the manufacture of the device unlike in a conventional method, and the structure of this embodiment can cope with a case in which a transmission line passes in a reverse mesa direction.

In this embodiment, the down converter, for which a partial thin film structure is effective, of the frequency conversion circuit has been exemplified. However, the present invention can be applied to, e.g., an up converter.

As described above, since the structure according to the present invention allows a decrease in width of a strip conductor, a chip size can be reduced. In addition, a transmission loss of a via-hole for connecting the strip conductor and a conductive layer on the lower surface can be reduced, an low-noise characteristics can be improved.

Since the microstrip line crossing a substrate surface portion where the thickness of a dielectric substrate is changed has a high characteristic impedance, the characteristic impedance of the microstrip line which crosses substrate portions having different thicknesses is not considerably changed. For this reason, according to the structure of the present invention, no mismatching occurs in a line portion, and a circuit connection technique with a small change in characteristics can be provided.

From the invention thus described, it will be obvious that the invention may be varied in many ways. Such variations are not to be regarded as a departure from the spirit and scope of the invention, and all such modifications as would be obvious to one skilled in the art are intended to be included within the scope of the following claims.

I claim:

1. A microwave device comprising:

a substrate made of a dielectric material; and a frequency conversion circuit formed on a front surface of said substrate and having a microstrip line for input and a radio frequency amplifier and having a microstrip line for output;

said substrate being partially thinned in a portion of a rear surface thereof which faces said radio frequency amplifier, the width of said microstrip for output being selected so that a change in the characteristic impedance of said microstrip line for output which crosses said front surface of the substrate, the thickness of which is changed by said thinned portion, is smaller than 10%.

2. A microwave device according to claim 1, wherein said change is smaller than 8.8%.

3. A microwave device comprising:

a substrate made of a dielectric material and having a conductive layer for a microstrip line on a back surface thereof; and a frequency conversion circuit formed on a front surface of said substrate and having a microstrip line for input and a radio frequency amplifier and having a microstrip line for output;

a portion of said radio frequency amplifier being electrically connected to said conductive layer through a through hole formed in said substrate, said substrate being partially thinned in a portion of said back surface thereof corresponding to said through hole, and the width of said micro-strip line for output being selected so that a change in the characteristic impedance of said microstrip line for output, which crosses the front surface of said substrate, a thickness of which is changed by said thinned portion, is smaller than 10%.

4. A microwave device according to claim 3, wherein said change is smaller than 8.8%.

5. A microwave device according to claim 1, wherein said radio frequency amplifier comprises a field transistor and a source terminal of said field effect transistor is electrically connected to said conductive layer though said through hole.

6. A microwave device according to claim 5, wherein said radio frequency amplifier comprises a plurality of said field effect transistors to provide a multi-stage amplifier.

7. A microwave device according to claim 3, wherein said radio frequency amplifier comprises a field effect transistor and a source terminal of said field effect transistor is electrically connected to said conductive layer though said through hole.

8. A microwave device according to claim 7, wherein said radio frequency amplifier comprises a plurality of said field effect transistors to provide a multi-stage amplifier.

* * * * *